Nov. 4, 1930.  L. THURM  1,780,572
OPTICAL DEVICE FOR RADIO CINEMATOGRAPHIC TRANSMITTERS AND RECEIVERS
Filed July 14, 1928  3 Sheets-Sheet 1
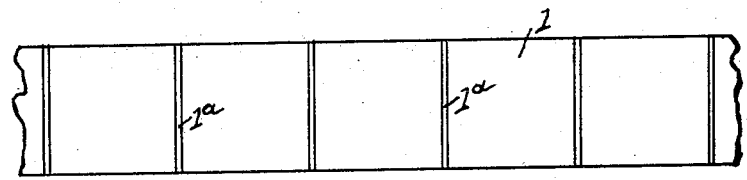
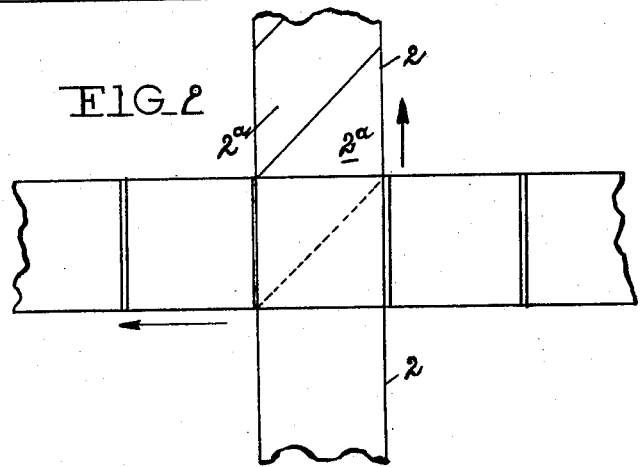
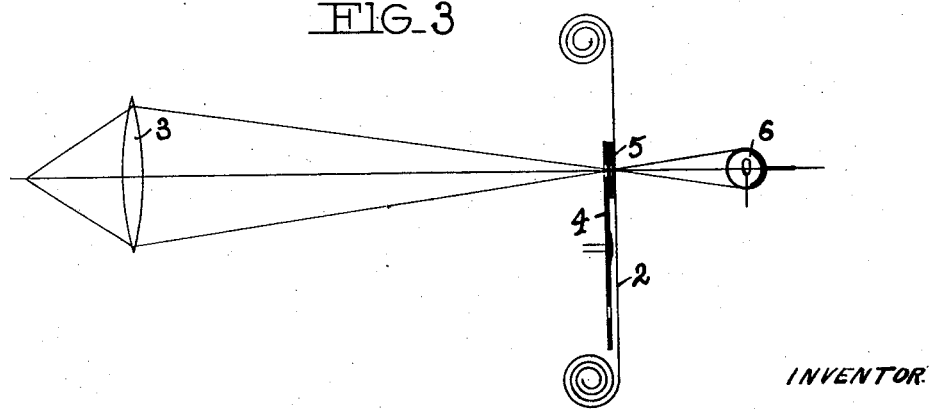
INVENTOR.
Leon Thurm
By William C. Linton
Attorney.

Nov. 4, 1930.  L. THURM  1,780,572
OPTICAL DEVICE FOR RADIO CINEMATOGRAPHIC TRANSMITTERS AND RECEIVERS
Filed July 14, 1928   3 Sheets-Sheet 2

INVENTOR.
Leon Thurm.

By William E. Linton.
Attorney.

Nov. 4, 1930.  L. THURM  1,780,572
OPTICAL DEVICE FOR RADIO CINEMATOGRAPHIC TRANSMITTERS AND RECEIVERS
Filed July 14, 1928  3 Sheets-Sheet 3
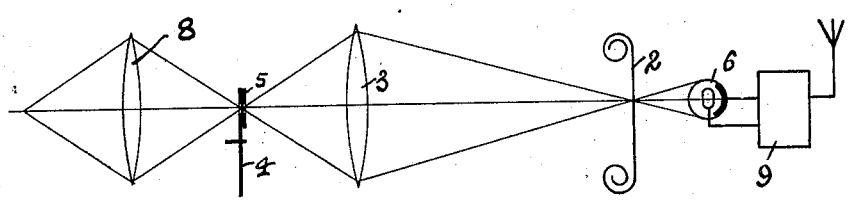
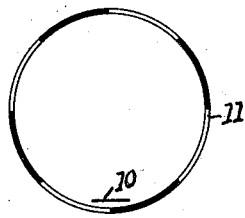
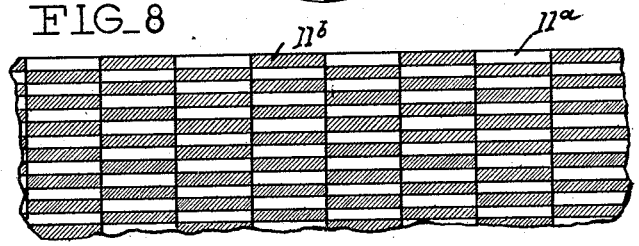
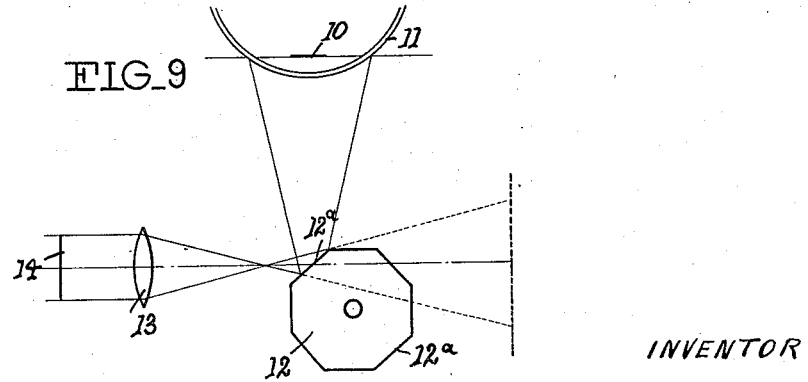
INVENTOR
Leon Thurm.
By William C. Linton
Attorney.

Patented Nov. 4, 1930

1,780,572

UNITED STATES PATENT OFFICE

LÉON THURM, OF PARIS, FRANCE

OPTICAL DEVICE FOR RADIO CINEMATOGRAPHIC TRANSMITTERS AND RECEIVERS

Application filed July 14, 1928, Serial No. 292,811, and in France July 21, 1927.

The present invention relates to an optical device for radio-cinematographic transmitters and receivers.

The view-taking apparatus adapted to form the images upon the film may be of the known type, but I preferably employ a simplified apparatus in which the film travels continuously and at a constant speed. In front of the film is moved, at the proper speed and at right angles to the direction of travel of the film, a shutter which may consist of a flexible band, a disk or the like comprising slots parallel with the film to be printed upon.

After the printing of the images, the film travels in front of a shutter placed behind the lens adapted to refract a beam from an illuminant of suitable power, supplied by a lantern or the like. The film travels relatively to the lens of the lantern in the conjugated image plane of the object plane containing the illuminant in the rear of a fixed screen, suitably apertured. In front of said screen is rotatable a disk having series of slots disposed upon two semicircles; and the two series are relatively displaced by the length of one slot. The surface of said slots is equal to one-half the surface of opening of the screen. At the rear of the film is placed a photo-electric bulb or a group of such bulbs which serve to modulate the transmitted waves of a radio transmitting station. Such transmitted waves are recorded in the receiving station by $n$ elements of an electromagnetic device described in the French patent granted to me under No. 640,115 of February 5th, 1927 and forming the subject matter of my U. S. application, Serial No. 248,924, filed January 23rd, 1928. These $n$ elements vary each of the currents flowing in the $n$ circuits, each circuit comprising an illuminant whose light depends upon the variations of the currents in the $n$ circuits.

These illuminants, which may consist of a set of neon bulbs, are placed in a shutter cylinder, and the rays which pass through it are reflected upon a lens by a drum comprising a plurality of plane mirrors.

The motion pictures may then be reproduced upon a screen placed at the rear of the said lens.

The appended drawings show by way of example an embodiment of the invention.

Fig. 1 is a partial front view of the shutter movable in front of the film at right angles to its direction of travel.

Fig. 2 shows the combination of the film and the shutter, the arrows showing the relative directions of motion.

Fig. 3 shows the optical system adapted to the scanning of the film, as well as the photoelectric bulb upon which fall the light beams straining through the film.

Fig. 6 shows a modification of the optical device in which the shutter system is situated, with reference to a lens forming a condenser in the conjugated plane of the plane which contains the illuminant, the film being situated with reference to the other lens in the conjugated plane of the plane which contains the closing device.

Fig. 7 shows the shutter cylinder containing the neon or other bulbs.

Fig. 8 is a partial view of the cylinder when opened out, showing its full and empty parts.

Fig. 9 shows the optical device placed in the receiver for the reproduction of the consecutive images of the transmitted film upon a screen.

Figure 4:
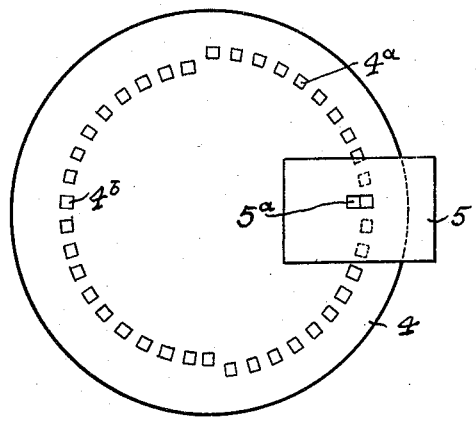
Fig. 4 is a front view of the shutter disk and the screen.

1 is the shutter which comprises the slots 1ª suitably spaced apart and which moves at a given speed in front of the film 2 and at right angles to its direction of travel. Due to the combined motion of the shutter 1 and the film 2, this latter is printed with the images at the parts 2ª having the form of parallelograms.

In Fig. 3, which shows the optical system, 3 is the lens in relation to which the rotating shutter disk 4, the screen 5 and the film 2 are placed in the conjugated plane of the plane which contains the illuminant. Behind these is situated the photo-electric bulb 6.

The shutter 4 comprises two series of apertures $4^a$—$4^b$ placed upon two half-circumferences, suitably spaced. The screen 5 also comprises an aperture $5^a$.

Figure 5:
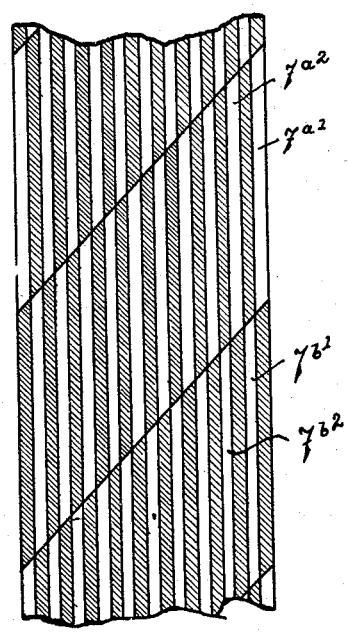
Fig. 5 shows the parts of the film which are alternately covered in an intermittent manner by the light from the illuminant.

In Fig. 5, $7^a$ and $7^b$ show the parts of the film 2 which are alternately lighted after traveling $n$ times at the rear of the said shutter disk. After each passage, there will be only two adjacent parallel parts scanned by the light beam of the illuminant.

In Fig. 6, 8 is the condenser adapted to condense the beam upon the shutter, and said beam then passes through the lens 3 by which they are converged—through the film 2—upon the photo-electric bulb 6 which comprises in its circuit the amplifier 9.

At the receiving end, a series of neon bulbs 10 is placed in a shutter cylinder 11, comprising empty or filled parts $11^a$, $11^b$, perpendicular to the axis of the cylinder.

The optical device shown in Fig. 9 comprises a drum 12 carrying the mirrors $12^a$, also the lens 13 and screen 14.

The operation is as follows:

The views-taking apparatus may be an apparatus which operates in the following manner. The film 2, instead of traveling by jerks, travels by a continuous and uniform motion. The shutter 1 moves at right angles to the travel of the film 2 and in the same plane, and may have the same size and shape as the film. The said shutter is opaque upon its whole surface except upon the small and very narrow rectangles $1^a$ which are spaced apart at equal distances in the direction of the width of the shutter. While the film 2 moves upwardly, the said shutter will move for example from right to left. The film, which is supposed to be properly placed in a view-taking apparatus, may thus take the images, not according to rectangular images as in the usual film, but according to parallelograms $2^a$ disposed without intervals the one below the others.

Let it be supposed that a film thus carrying images is employed, and that its negatives occupy parallelograms having for instance 24 mm. height and width. I place this film before a lantern apparatus in the plane in which there is formed a real image of the illuminant placed on the other side of the lens. Between the lens and the film, and adjacent the film, I place a shutter consisting of a perforated disk 4 and a fixed screen 5 having the rectangular aperture $5^a$ in such manner that if the rotary disk 4 were not in place, a rectangular spot of light would be formed upon the film 2. The disk may carry two sets of holes which may be square, and these are so placed that by the motion of the disk there will be disengaged one half of the rectangular aperture $5^a$ of the screen 5; if for instance the disk 4 has 200 apertures, each half of the aperture $5^a$ of the screen 5 will be closed 100 times during a revolution of the disk. If when the disk is rotating, the film 2 moves in the direction of the arrow in Fig. 2, two parts $7^a$—$7^b$ (Fig. 5) of the film 2 will be alternately covered in an intermittent manner by the beam of light. I may obtain like results by placing the shutter between the condenser 8 and the lens 3 in the image plane of the illuminant relatively to the said condenser (Fig. 6).

If for instance 20 images, 24 mm. height and width, travel in one second before the lens, and if the disk 4 carrying two series of 100 apertures $4^a$—$4^b$ makes 10 rotations per second, while the screen 5 has an aperture $5^a$ such that each time that an aperture in the disk passes, it would illuminate a square of 0.3 mm. of the film 2 if the film were stationary, the rotating device will alternately scan, each tenth of a second, a space $7^{a1}$ and a space $7^{b1}$ (Fig. 5).

After the first passage of the film 2, it may be moved in such manner that the spaces $7^{a2}$ and $7^{b2}$ will be covered in the same manner when the film passes a second time.

After 40 successive passages, the whole width of the film will be covered. If during these 40 successive passages a photo-electric bulb had been acted upon by the rays of light thus traversing the film 2 as shown in Figs. 3 and 6, the said bulb would have modulated the transmitted waves of a radio station which would have been recorded at the receiving station on the 40 elements of a known electromagnetic device such as that described in the French patent granted to me under No. 640,115 of February 5th, 1927, and forming the subject matter of my U. S. application, Serial Number 248,924 filed January 23rd, 1928, each element consisting essentially in an electro-magnet, recording current variations upon a magnetic spiral.

In this manner I am enabled to reproduce at the receiving station the scene which was recorded on the film at the transmitting station. For this purpose, I place in each of the 40 circuits modulated by the 40 elements of the said electromagnetic device, an illuminant whose light varies according to the modulation of the said circuit. These illuminants, for instance 40 neon lamps, illuminate 40 rectangular spaces 1 x 2 cm. on the sides, for example, which may consist of translucent glass and are juxtaposed in the lengthwise direction. If this luminous surface 10 is placed in the interior of a shutter cylinder parallel with the axis but quite near the lateral surface, as shown in Fig. 7 which is a section perpendicular to the axis of the cylinder, and if I rotate the shutter cylinder 11 whose lateral surface, when spread out, has the appearance shown in Fig. 8, one-half of each luminous spot will be alternately shut off by the solid part of the shutter 11 if these parts, and hence the apertures, have a width equal to one-half the length of each luminous spot. Hence, if the shutter 11 comprises 80 rows of solid parts and apertures of 1 cm. width and 10 cm. length, and if the shutter making for instance two revolutions per second, has a circumference of one meter, each half of each luminous spot will be visible and darkened alternately each 1/20 second.

Opposite this arrangement I may place a drum carrying 10 plane mirrors and making two revolutions per second; an observer at 13 would then see at 15 the moving image of the scene recorded on the film at the transmitting station. If in the place of the observer I dispose a lens, the said film-recorded scene may be reproduced upon a screen placed at 14 (Fig. 9).

Obviously, I may employ other constructional forms of apparatus without departing from the spirit of the invention, and may also suitably modify the details of construction and assembling. For the aforesaid parts described by way of example, I may substitute other parts serving the same purpose and affording like results.

In this manner, in the transmitting station the disk shutter may be replaced by a cylindrical shutter. In the receiving station, the closing drum may be replaced by a disk.

It is further obvious that the number of neon or other bulbs may be varied, as also the number of apertures or series of spots of the closing system.

The number of series of apertures in the shutter disk of the sending station may vary according to the speed of rotation of said disk, and the size and shape of the apertures in the disk may vary in order to increase the efficiency.

The film at the transmitting station may be a positive or a negative film, and in this latter case, it will be simply necessary to reverse the variations of the currents in the amplifying system.

The time of the transmission may be much reduced by the use of a multiplex outfit, so arranged for instance that several beams of light will simultaneously cover different spots of the film, thus modulating one or more waves by means of a certain number of photo-electric bulbs.

I claim:

1. A device of the character described comprising a film, a rotatable shutter having series of openings formed therein, said openings displaced in position with rotation of the shutter, a screen disposed between the shutter and the film and carrying a rectangular aperture of a length equal to the double of the corresponding dimension of the aperture in the shutter.

2. A device of the character described comprising a film, a rotatable shutter having two opposed semi-circular series of openings of different circumferences, a screen disposed between the shutter and the film and carrying an aperture capable of successively registering with each of said series of openings in the shutter upon rotation thereof for alternately exploring two longitudinal regions of said film, each region having a length equal to a certain predetermined portion of the width of said film.

3. A device of the character described comprising a film, a rotatable shutter having two opposed semi-circular series of openings of different circumferences, a screen disposed between the shutter and the film and carrying a rectangular aperture capable of successively registering with each of said series of openings in the shutter upon rotation thereof, and a photoelectric bulb disposed to receive a beam of light passing through the shutter and film for modulating the longitudinal regions of the film explored by said shutter and screen.

4. In a device of the character described, a uniformly traveling film, a shutter having a plurality of rectangular and equi-distant apertures formed therein, said shutter moving uniformly in a plane parallel to that of the film but in a direction perpendicular to the travel of said film, whereby the views formed on the film by the light passing through the rectangular and equi-distant apertures of the shutter will be juxtaposed and have the form of parallelograms.

In witness whereof I have hereunto set my hand.

LÉON THURM.